United States Patent
Xu et al.

(10) Patent No.: US 10,140,904 B2
(45) Date of Patent: Nov. 27, 2018

(54) ORGANIC LIGHT EMITTING DIODE DISPLAY PANEL AND DRIVING METHOD THEREOF AND ORGANIC LIGHT EMITTING DIODE DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Liyan Xu, Beijing (CN); Haiqin Huang, Beijing (CN); Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/167,082

(22) Filed: May 27, 2016

(65) Prior Publication Data

US 2017/0076651 A1    Mar. 16, 2017

(30) Foreign Application Priority Data

Sep. 15, 2015   (CN) .......................... 2015 1 0587832

(51) Int. Cl.
*G09G 3/20* (2006.01)
*H04N 13/324* (2018.01)
(Continued)

(52) U.S. Cl.
CPC .......... *G09G 3/2003* (2013.01); *G09G 3/003* (2013.01); *H04N 13/324* (2018.05);
(Continued)

(58) Field of Classification Search
CPC ................ G09G 3/2003; G09G 3/003; G09G 2300/0452; G09G 2300/023; H04N 12/0422; H04N 13/0431
See application file for complete search history.

(56) References Cited

U.S. PATENT DOCUMENTS

2002/0163295 A1    11/2002   Liang et al.
2006/0082295 A1*   4/2006    Chin .................... H01L 27/322
                                                          313/506
(Continued)

FOREIGN PATENT DOCUMENTS

CN         104391407 A        3/2015

OTHER PUBLICATIONS

The Second Chinese office action dated Sep. 29, 2017; Appln. No. 201510587832.2.
(Continued)

*Primary Examiner* — Kwang-Su Yang
(74) *Attorney, Agent, or Firm* — Ladas & Parry LLP

(57) ABSTRACT

Embodiments of the present disclosure relate to a display panel and a driving method thereof and a display device. The display panel comprises: a plurality of pixel units, each pixel unit including six colors of sub-pixels: a red sub-pixel, a green sub-pixel, a blue sub-pixel, a cyan sub-pixel, a fuchsine sub-pixel and a yellow sub-pixel, wherein, in the six colors of sub-pixels, three colors of sub-pixels and the other three colors of sub-pixels are arranged in an overlapping manner in a light exiting direction perpendicular to the display panel.

17 Claims, 2 Drawing Sheets

(51) Int. Cl.
*G09G 3/00* (2006.01)
*H04N 13/334* (2018.01)
(52) U.S. Cl.
CPC ..... *H04N 13/334* (2018.05); *G09G 2300/023* (2013.01); *G09G 2300/0452* (2013.01)

(56) References Cited

U.S. PATENT DOCUMENTS

| | | | |
|---|---|---|---|
| 2011/0115693 A1 | 5/2011 | Kim | |
| 2011/0279029 A1* | 11/2011 | Hirakata | ............... H01L 25/048 313/504 |
| 2015/0008396 A1* | 1/2015 | Naijo | .................. H01L 51/0097 257/40 |
| 2016/0148984 A1* | 5/2016 | Kim | .................... H01L 51/0097 257/40 |

OTHER PUBLICATIONS

The First Chinese Office Action dated Jul. 24, 2017; Appln. No. 201510587832.2.

\* cited by examiner

ORGANIC LIGHT EMITTING DIODE DISPLAY PANEL AND DRIVING METHOD THEREOF AND ORGANIC LIGHT EMITTING DIODE DISPLAY DEVICE

CROSS-REFERENCE TO RELATED APPLICATIONS

The application claims priority of Chinese Patent Application No. 201510587832.2 filed on Sep. 15, 2015, the disclosure of which is incorporated herein by reference in its entirety as part of the present application.

TECHNICAL FIELD

Embodiments of the present disclosure relate to a display panel and a driving method thereof and a display device.

BACKGROUND

Currently, along with gradual development of a display industry, people have higher and higher requirements for a display effect of a display. Advantages of high quality, low power consumption, small volume, energy saving, multi-function and the like are gradually popular with people.

An Organic Light Emitting Diode (OLED) display device has advantages of large viewing angle, low power consumption, light weight, high response speed and the like, and has great potential to meet various requirements of people so as to become a mainstream display product, but when the OLED is applied to a specific display panel, brightness and resolution of the OLED still remain to be improved.

SUMMARY

Embodiments of the present disclosure relate to a display panel and a driving method thereof and a display device, which is capable of improving the brightness of the display panel.

In one aspect, an embodiment of the present disclosure provides a display panel comprises: a plurality of pixel units, each pixel unit including six colors of sub-pixels: a red sub-pixel, a green sub-pixel, a blue sub-pixel, a cyan sub-pixel, a fuchsine sub-pixel and a yellow sub-pixel, wherein, in the six colors of sub-pixels, three colors of sub-pixels and the other three colors of sub-pixels are arranged in an overlapping manner in a light exiting direction perpendicular to the display panel.

In another aspect, an embodiment of the present disclosure provides a display device comprising the display panel as mentioned above.

In another aspect, an embodiment of the present disclosure provides a driving method for the display panel as mentioned above, comprises: controlling any one of three pairs of sub-pixels with complementary mutually colors in the six colors of sub-pixels to be turned on, or controlling the red sub-pixel, the green sub-pixel and the blue sub-pixel to be turned on so as to enable the pixel unit to display white; controlling the red sub-pixel, and/or the yellow sub-pixel and the blue sub-pixel, and/or the fuchsine sub-pixel and the green sub-pixel to be turned on so as to enable the pixel unit to display red; controlling the green sub-pixel, and/or the yellow sub-pixel and the blue sub-pixel, and/or the cyan sub-pixel and the fuchsine sub-pixel to be turned on so as to enable the pixel unit to display green; controlling the blue sub-pixel, and/or the cyan sub-pixel and the red sub-pixel, and/or the fuchsine sub-pixel and the green sub-pixel to be turned on so as to enable the pixel unit to display blue; controlling the yellow sub-pixel and/or the red sub-pixel, the green sub-pixel and the blue sub-pixel to be turned on so as to enable the pixel unit to display yellow; and controlling the fuchsine sub-pixel and/or the red sub-pixel, the green sub-pixel and the blue sub-pixel to be turned on so as to enable the pixel unit to display fuchsine; and controlling the cyan sub-pixel and/or the red sub-pixel, the green sub-pixel and the blue sub-pixel to be turned on so as to enable the pixel unit to display cyan.

In another aspect, an embodiment of the present disclosure provides a driving method for driving the display panel as mentioned above, comprises: controlling the red sub-pixel, the green sub-pixel and the blue sub-pixel to display an image for one eye in a 3D image, and controlling the cyan sub-pixel, the fuchsine sub-pixel and the yellow sub-pixel to display an image for the other eye in the 3D image.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Many specific details are illustrated in the description as follows so as to sufficiently understand the present disclosure, however, the present disclosure also can adopt other embodiments different from the description herein, and thus, the scope of the protection of the present disclosure is not limited to the specific embodiments disclosed as follows.

Figure 1:
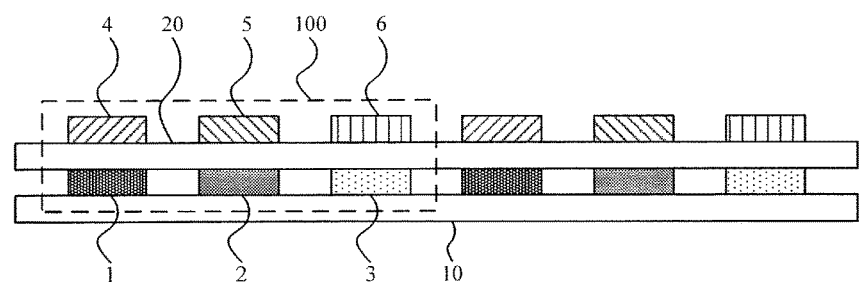
FIG. 1 shows a structural schematic diagram of a display panel according to an embodiment of the present disclosure.

As shown in FIG. 1, a display panel according to one embodiment of the present disclosure includes a plurality of pixel units 100. Each pixel unit 100 includes a red sub-pixel 1, a green sub-pixel 2, a blue sub-pixel 3, a cyan sub-pixel 4, a fuchsine sub-pixel 5 and a yellow sub-pixel 6, wherein in the six colors of sub-pixels, three colors of sub-pixels and the other three colors of sub-pixels are arranged in an overlapping manner in a light exiting direction perpendicular to the display panel.

Exemplarily, the display panel according to one embodiment of the present disclosure further includes:

A first base substrate 10, the three colors of sub-pixels in the pixel unit 100 are arranged on the first base substrate 10; and A second base substrate 20 which is arranged on the three colors of sub-pixels, the other three colors of sub-pixels in the pixel unit 100 are arranged on the second substrate 20.

Red and cyan are complementary colors mutually, green and fuchsine are complementary colors mutually, and blue and yellow are complementary colors mutually, and thus, by arranging the six colors of sub-pixels in the pixel unit, when the pixel unit displays a certain color, the red, green and blue sub-pixels may be controlled to be matched, so as to emit light with the color, and by controlling the cyan, fuchsine and yellow sub-pixels to be matched to also emit light with the color, brightness of the display unit is improved.

For example, when the pixel unit needs to display red, the red sub-pixel and the yellow sub-pixel as well as the blue sub-pixel may be controlled to be turned on, and by turned on the yellow sub-pixel and the blue sub-pixel, white light may be emitted, and the red sub-pixel emit red light, and thus, brightness of red light emitted by the pixel unit can be improved. Certainly, only the red sub-pixel also may be controlled to be turned on so as to save power consumption. The display pixel unit also may display other colors in the same way, and brightness of the color displayed by the pixel unit can be improved.

Examples that the display units display various colors are as follows:

When the pixel unit needs to display white, any one of three pairs of sub-pixels each pair having complementary colors mutually in six colors of sub-pixels may be controlled to be turned on, or the red sub-pixel, the green sub-pixel and the blue sub-pixel are controlled to be turned on;

When the pixel unit needs to display red, the red sub-pixel, and/or the yellow sub-pixel and the blue sub-pixel, and/or the fuchsine sub-pixel and the green sub-pixel are controlled to be turned on;

When the pixel unit needs to display green, the green sub-pixel, and/or the yellow sub-pixel and the blue sub-pixel, and/or the cyan sub-pixel and the red sub-pixel are controlled to be turned on;

When the pixel unit needs to display blue, the blue sub-pixel, and/or the cyan sub-pixel and the red sub-pixel, and/or the fuchsine sub-pixel and the green sub-pixel are controlled to be turned on, and the cyan sub-pixel and the fuchsine sub-pixel also may be controlled to be turned on;

When the pixel unit needs to display yellow, the yellow sub-pixel and/or the red sub-pixel, the green sub-pixel and the blue sub-pixel are controlled to be turned on;

When the pixel unit needs to display fuchsine, the fuchsine sub-pixel and/or the red sub-pixel, the green sub-pixel and the blue sub-pixel are controlled to be turned on; and When the pixel unit needs to display cyan, the cyan sub-pixel and/or the red sub-pixel, the green sub-pixel and the blue sub-pixel are controlled to be turned on.

Figure 2:
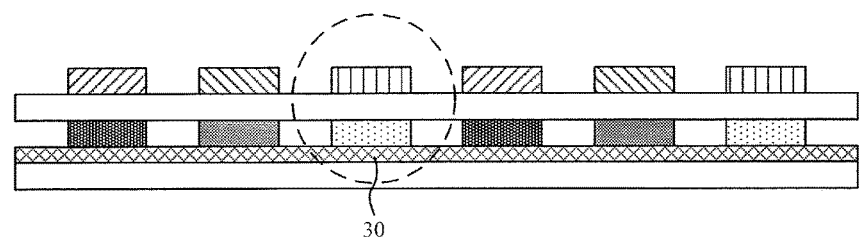
FIG. 2 shows a structural schematic diagram of a display panel according to another embodiment of the present disclosure.

Exemplarily, as shown in FIG. 2, the display panel according to an embodiment of the present disclosure further comprises:

a reflecting electrode 30, arranged between the first base substrate 10 and the three colors of sub-pixels, Wherein the other three colors of sub-pixels on the second base substrate 20 are made of transparent material.

By arranging the reflecting electrode between the first base substrate and the three colors of sub-pixels, light emitted towards the first base substrate by the other three colors of sub-pixels on the second base substrate and light emitted towards the first base substrate by the three colors of sub-pixels on the first base substrate are reflected by the reflecting electrode, and are emitted out through the second base substrate, thereby improving the utilization rate of the light emitted by the sub-pixels.

Figure 3:
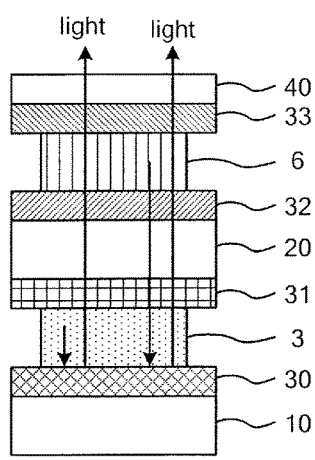
FIG. 3 shows an amplified schematic diagram of a structure shown in a dash line part in FIG. 2.

As shown in FIG. 3, the display panel in the embodiment, except the reflecting electrode 30, also may include a first electrode 31 (not shown in FIG. 2) arranged on the three colors of sub-pixels on the first base substrate 10, a second electrode 32 (not shown in FIG. 2) arranged between the second base substrate 20 and the other three colors of sub-pixels, and a third electrode 33 (not shown in FIG. 2) arranged on the other three colors of sub-pixels on the second base substrate 20. Protective glass 40 also may be arranged on the third electrode 33.

Wherein the reflecting electrode may be used as an anode of the three colors of sub-pixels on the first base substrate, the first electrode may be used as a cathode of the three colors of sub-pixels on the first base substrate; the second electrode may be used as an anode of the other three colors of sub-pixels on the second base substrate, and the third electrode may be used as a cathode of the other three colors of sub-pixels on the second base substrate.

In order to guarantee the light reflected by the reflecting electrode to be successfully transmitted, semitransparent or transparent material may be selected to make the first electrode, the second electrode and the third electrode.

Exemplarily, the three colors of sub-pixels include two of the red sub-pixel 1, the green sub-pixel 2 and the blue sub-pixel 3, and one of the cyan sub-pixel 4, the fuchsine sub-pixel 5 and the yellow sub-pixel 6, The other three colors of sub-pixels include the other one of the red sub-pixel 1, the green sub-pixel 2 and the blue sub-pixel 3, and the other two of the cyan sub-pixel 4, the fuchsine sub-pixel 5 and the yellow sub-pixel 6.

Exemplarily, a first sub-pixel and a second sub-pixel are arranged adjacently, and a fourth sub-pixel and a fifth sub-pixel are arranged adjacently.

Exemplarily, when the red sub-pixel 1, the green sub-pixel 2 and the blue sub-pixel 3 display an image for one eye in a 3D image, the cyan sub-pixel 4, the fuchsine sub-pixel 5 and the yellow sub-pixel 6 display an image for the other eye in the 3D image.

The red sub-pixel, the green sub-pixel and the blue sub-pixel may be combined into all colors, and the cyan sub-pixel, the fuchsine sub-pixel and the yellow sub-pixel also may be combined into all colors, and thus, in the 3D displaying process, the red sub-pixel, the green sub-pixel and the blue sub-pixel may be controlled to display the image for one eye, and the cyan sub-pixel, the fuchsine sub-pixel and the yellow sub-pixel may be controlled to display the image for the other eye.

A structure of sub-pixels is arranged according to an embodiment, so that the sub-pixels which display an image for the left eye and an image for the right eye may only occupy an area of three sub-pixels, however, in the prior art, two pixel units are required to respectively display the image for the left eye and the image for the right eye and need to occupy an area of six sub-pixels. Therefore, compared to the prior art, according to the embodiment, a rate of utilizing a pixel region is improved, and more sub-pixels may be arranged in a certain area, so that a 3D display resolution of the display panel is improved.

Exemplarily, a first sub-pixel and a second sub-pixel in the red sub-pixel 1, the green sub-pixel 2 and the blue sub-pixel 3 are positioned on the second base substrate 20, a third sub-pixel is positioned on the first base substrate 10 and is arranged corresponding to the first sub-pixel, a fourth sub-pixel and a fifth sub-pixel in the cyan sub-pixel 4, the fuchsine sub-pixel 5 and the yellow sub-pixel 6 are positioned on the first base substrate 10, a sixth sub-pixel is positioned on the second base substrate 20 and is arranged corresponding to the fourth sub-pixel, and the second sub-pixel and the fifth sub-pixel are correspondingly arranged.

Figure 4:
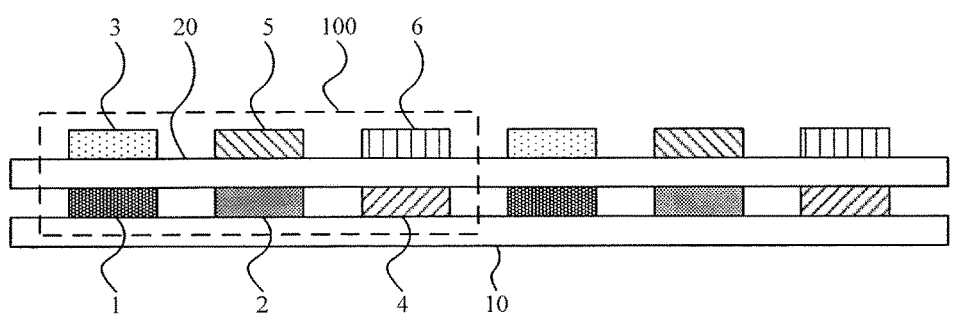
FIG. 4 shows a structural schematic diagram of a display panel according to another embodiment of the present disclosure.

As shown in FIG. 4, the red sub-pixel 1, the green sub-pixel 2 and the cyan sub-pixel 4 may be arranged on the first base substrate 10, and the blue sub-pixel 3, the fuchsine sub-pixel 5 and the yellow sub-pixel 6 may be arranged on the second base substrate 20, wherein the red sub-pixel 1 and the blue sub-pixel 3 are correspondingly arranged, the green sub-pixel 2 and the fuchsine sub-pixel 5 are correspondingly arranged, and the cyan sub-pixel 4 and the yellow sub-pixel 6 are correspondingly arranged.

In the embodiment, the red sub-pixel, the green sub-pixel and the blue sub-pixel are close to one side of the pixel unit, and the cyan sub-pixel, the fuchsine sub-pixel and the yellow sub-pixel are close to the other side of the pixel unit, and thus, when the image for one eye is displayed by the red sub-pixel, the green sub-pixel and the blue sub-pixel and the image for the other eye is displayed by the cyan sub-pixel, the fuchsine sub-pixel and the yellow sub-pixel, a certain distance may be reserved between the images of two eyes, so that influence of visual time delay is reduced.

Figure 5:
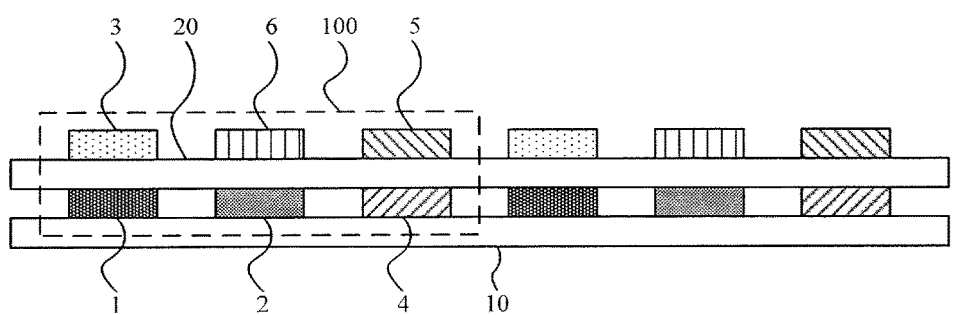
FIG. 5 shows a structural schematic diagram of a display panel according to another embodiment of the present disclosure.

Exemplarily, as shown in FIG. 5, one of the cyan sub-pixel 4 and the fuchsine sub-pixel 5 is the fourth sub-pixel, and the other one of the cyan sub-pixel 4 and the fuchsine sub-pixel 5 is the sixth sub-pixel.

Organic light-emitting material emitting blue light has a short life, and the cyan sub-pixel and the fuchsine sub-pixel also may synthesize the blue light when being simultaneously turned on, and thus, the fuchsine sub-pixel and the cyan sub-pixel may be arranged at corresponding positions of the second base substrate and the first base substrate, and are guaranteed to emit light at the same positions when being simultaneously turned on so as to well synthesize the blue light.

Exemplarily, the red sub-pixel 1, the green sub-pixel 2, the blue sub-pixel 3, the cyan sub-pixel 4, the fuchsine sub-pixel 5 and the yellow sub-pixel 6 are made of organic light-emitting material, and the first base substrate 10 and the second base substrate 20 are made of flexible material. The flexible material is more suitable for making a flexible panel when being collocated with the organic light-emitting material.

An embodiment of the present disclosure further discloses a display device, including the display panel.

It should be noted that the display device in the embodiments may be any product or part with a display function, e.g., electronic paper, a mobile phone, a tablet computer, a television, a notebook computer, a digital photo frame, a navigator, etc.

An embodiment of the present disclosure further discloses a driving method for driving the display panel, comprising:

Controlling any one of three pairs of sub-pixels with complementary mutually colors in six colors of sub-pixels to be turned on, or controlling the red sub-pixel, the green sub-pixel and the blue sub-pixel to be turned on so as to enable the pixel unit to display white;

Controlling the red sub-pixel, and/or the yellow sub-pixel and the blue sub-pixel, and/or the fuchsine sub-pixel and the green sub-pixel to be turned on so as to enable the pixel unit to display red;

Controlling the green sub-pixel, and/or the yellow sub-pixel and the blue sub-pixel, and/or the cyan sub-pixel and the red sub-pixel to be turned on so as to enable the pixel unit to display green;

Controlling the blue sub-pixel, and/or the cyan sub-pixel and the red sub-pixel, and/or the fuchsine sub-pixel and the green sub-pixel to be turned on so as to enable the pixel units to display blue;

Controlling the yellow sub-pixel and/or the red sub-pixel, the green sub-pixel and the blue sub-pixel to be turned on so as to enable the pixel unit to display yellow;

Controlling the fuchsine sub-pixel and/or the red sub-pixel, the green sub-pixel and the blue sub-pixel to be turned on so as to enable the pixel unit to display fuchsine;

And controlling the cyan sub-pixel and/or the red sub-pixel, the green sub-pixel and the blue sub-pixel to be turned on so as to enable the pixel unit to display cyan.

Exemplarily, the driving method further comprises: controlling the cyan sub-pixel and the fuchsine sub-pixel to be turned on so as to enable the pixel unit to display blue.

An embodiment of the present disclosure further discloses the driving method for driving the display panel, comprising:

Controlling the red sub-pixel, the green sub-pixel and the blue sub-pixel to display an image for one eye in the 3D image, and controlling the cyan sub-pixel, the fuchsine sub-pixel and the yellow sub-pixel to display an image for the other eye in the 3D image.

The above illustrates the technical solutions of the embodiments of the present disclosure in details in connection with the drawings. In consideration of a condition that in the prior art, brightness of the display panel still remains to be improved, according to the technical solutions of the embodiments of the present disclosure, red and cyan are complementary colors mutually, green and fuchsine are complementary colors mutually, and blue and yellow are complementary colors mutually, and thus, by arranging the six colors of sub-pixels in the pixel units, when the pixel units display a certain color, one part of sub-pixels may be controlled to cooperatively emit light with the color, and the other part of sub-pixels may be controlled to cooperatively emit white light, so that brightness of a display unit is improved. Moreover, in the 3D displaying process, the sub-pixels which display the image for the left eye and the image for the right eye may only occupy an area of three sub-pixels, and compared to the prior art, the rate of utilizing the pixel region is improved, and more sub-pixels may be arranged in a certain area, so that the 3D display resolution of the display panel is improved.

It should be noted that in the drawings, in order to make diagrams clear, sizes of layers and areas are possibly exaggerated. Moreover, it can be understood that when a component or a layer is known to be "on" another component or layer, the component or the layer can be directly on other components, or middle layers can exist. In addition, it can be understood that when the component or the layer is known to be "under" another component or layer, the component or the layer can be directly under other components, or more than one middle layers or components can exist. In addition, it also can be understood that when the layer or the component is known to be "between" two layers or two components, the layer or the component can be the only layer between two layers or two components, or more than one middle layers or components also can exist. Throughout the description, similar reference signs indicate similar components.

In the present disclosure, words such as "first", "second", "third", "fourth", "fifth" and "sixth" do not denote or suggest any relative importance, but rather are only for purpose of illustration. Words such as "a plurality of" indicate there are at least two, unless specifically defined otherwise.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The application claims priority of Chinese Patent Application No. 201510587832.2 filed on Sep. 15, 2015, the disclosure of which is incorporated herein by reference in its entirety as part of the present application.

The invention claimed is:

1. An organic light emitting diode (OLED) display panel, comprising a plurality of pixel units, each pixel unit including six colors of sub-pixels: a red sub-pixel, a green sub-pixel, a blue sub-pixel, a cyan sub-pixel, a fuchsine sub-pixel and a yellow sub-pixel,
wherein, in the six colors of sub-pixels, three colors of sub-pixels and the other three colors of sub-pixels are arranged in an overlapping manner in a light exiting direction perpendicular to the display panel, and
wherein the three colors of sub-pixels include two of the red sub-pixel, the green sub-pixel and the blue sub-pixel, and one of the cyan sub-pixel, the fuchsine sub-pixel and the yellow sub-pixel, and
the other three colors of sub-pixels include the other one of the red sub-pixel, the green sub-pixel and the blue sub-pixel, and the other two of the cyan sub-pixel, the fuchsine sub-pixel and the yellow sub-pixel.

2. The organic light emitting diode (OLED) display panel according to claim 1, further comprising:
a first base substrate, the three colors of sub-pixels in the pixel unit being arranged on the first base substrate; and
a second base substrate which is arranged on the three colors of sub-pixels, the other three colors of sub-pixels being arranged on the second substrate.

3. The organic light emitting diode (OLED) display panel according to claim 2, further comprising:
a reflecting electrode, arranged between the first base substrate and the three colors of sub-pixels,
wherein the other three colors of sub-pixels on the second base substrate are made of transparent material.

4. The organic light emitting diode (OLED) display panel according to claim 3, further comprising:
a first electrode, arranged on the three colors of sub-pixels on the first base substrate;
a second electrode, arranged between the second base substrate and the other three colors of sub-pixels; and
a third electrode, arranged on the other three colors of sub-pixels.

5. The organic light emitting diode (OLED) display panel according to claim 2, wherein the red sub-pixel, the green sub-pixel, the blue sub-pixel, the cyan sub-pixel, the fuchsine sub-pixel and the yellow sub-pixel are made of organic light-emitting material,
and the first base substrate and the second base substrate are made of flexible material.

6. The organic light emitting diode (OLED) display panel according to claim 1, wherein in the light exiting direction perpendicular to the display panel, the three colors of sub-pixels and the other three colors of sub-pixels are arranged in a one-to-one correspondence relationship.

7. The organic light emitting diode (OLED) display panel according to claim 1, wherein when the red sub-pixel, the green sub-pixel and the blue sub-pixel display an image for one eye in a 3D image, the cyan sub-pixel, the fuchsine sub-pixel and the yellow sub-pixel display an image for the other eye in the 3D image.

8. A driving method for driving the organic light emitting diode (OLED) display panel according to claim 7, comprising:
controlling the red sub-pixel, the green sub-pixel and the blue sub-pixel to display an image for one eye in a 3D image, and controlling the cyan sub-pixel, the fuchsine sub-pixel and the yellow sub-pixel to display an image for the other eye in the 3D image.

9. The organic light emitting diode (OLED) display panel according to claim 1, wherein a first sub-pixel and a second sub-pixel in the red sub-pixel, the green sub-pixel and the blue sub-pixel are positioned on the second base substrate, a third sub-pixel is positioned on the first base substrate and is arranged corresponding to the first sub-pixel,
a fourth sub-pixel and a fifth sub-pixel in the cyan sub-pixel, the fuchsine sub-pixel and the yellow sub-pixel are positioned on the first base substrate, a sixth sub-pixel is positioned on the second base substrate and is arranged corresponding to the fourth sub-pixel, and
the second sub-pixel and the fifth sub-pixel are correspondingly arranged.

10. The organic light emitting diode (OLED) display panel according to claim 9, wherein the first sub-pixel and the second sub-pixel are arranged adjacently, and the fourth sub-pixel and the fifth sub-pixel are arranged adjacently.

11. The organic light emitting diode (OLED) display panel according to claim 9, wherein one of the cyan sub-pixel and the fuchsine sub-pixel is the fourth sub-pixel, and the other of the cyan sub-pixel and the fuchsine sub-pixel is the sixth sub-pixel.

12. An organic light emitting diode (OLED) display device, comprising the display panel according to claim 1.

13. A driving method for the organic light emitting diode (OLED) display panel according to claim 1, comprising:
controlling any one of three pairs of sub-pixels with complementary mutually colors in the six colors of sub-pixels to be turned on, or controlling the red sub-pixel, the green sub-pixel and the blue sub-pixel to be turned on so as to enable the pixel unit to display white;
controlling the red sub-pixel, and/or the yellow sub-pixel and the blue sub-pixel, and/or the fuchsine sub-pixel and the green sub-pixel to be turned on so as to enable the pixel unit to display red;
controlling the green sub-pixel, and/or the yellow sub-pixel and the blue sub-pixel, and/or the cyan sub-pixel and the fuchsine sub-pixel to be turned on so as to enable the pixel unit to display green;
controlling the blue sub-pixel, and/or the cyan sub-pixel and the red sub-pixel, and/or the fuchsine sub-pixel and the green sub-pixel to be turned on so as to enable the pixel unit to display blue;
controlling the yellow sub-pixel and/or the red sub-pixel, the green sub-pixel and the blue sub-pixel to be turned on so as to enable the pixel unit to display yellow;
controlling the fuchsine sub-pixel and/or the red sub-pixel, the green sub-pixel and the blue sub-pixel to be turned on so as to enable the pixel unit to display fuchsine; and controlling the cyan sub-pixel and/or the red sub-pixel, the green sub-pixel and the blue sub-pixel to be turned on so as to enable the pixel unit to display cyan.

14. The driving method for the organic light emitting diode (OLED) display panel according to claim 13, further comprising:

controlling the cyan sub-pixel and the fuchsine sub-pixel to be turned on so as to enable the pixel unit to display blue.

15. An organic light emitting diode (OLED) display panel, comprising a plurality of pixel units, each pixel unit including six colors of sub-pixels: a red sub-pixel, a green sub-pixel, a blue sub-pixel, a cyan sub-pixel, a fuchsine sub-pixel and a yellow sub-pixel, wherein, in the six colors of sub-pixels, three colors of sub-pixels and the other three colors of sub-pixels are arranged in a completely overlapping manner in a light exiting direction perpendicular to the display panel, and a material of the sub-pixels arranged on a light emitting side of the display panel comprises a transparent material, wherein the three colors of sub-pixels include two of the red sub-pixel, the green sub-pixel and the blue sub-pixel, and one of the cyan sub-pixel, the fuchsine sub-pixel and the yellow sub-pixel, and the other three colors of sub-pixels include the other one of the red sub-pixel, the green sub-pixel and the blue sub-pixel, and the other two of the cyan sub-pixel, the fuchsine sub-pixel and the yellow sub-pixel.

16. The organic light emitting diode (OLED) display panel according to claim 15, further comprising:

a reflecting electrode, arranged between the first base substrate and the three colors of sub-pixels, wherein the other three colors of sub-pixels on the second base substrate are made of transparent material.

17. The organic light emitting diode (OLED) display panel according to claim 15, wherein when the red sub-pixel, the green sub-pixel and the blue sub-pixel display an image for one eye in a 3D image, the cyan sub-pixel, the fuchsine sub-pixel and the yellow sub-pixel display an image for the other eye in the 3D image.

* * * * *